United States Patent [19]

Smelker

[11] Patent Number: 5,383,299

[45] Date of Patent: Jan. 24, 1995

[54] FISHING ROD HOLDERS

[76] Inventor: Delmer M. Smelker, 1126 Calvert St., Colorado Springs, Colo. 80904

[21] Appl. No.: 130,797

[22] Filed: Oct. 4, 1993

[51] Int. Cl.$^6$ .............................................. A01K 97/10
[52] U.S. Cl. ..................................... 43/21.2; 248/513; 248/530
[58] Field of Search ................. 43/21.2, 54.1, 17, 27.4; 248/511, 512, 513, 538, 530, 533

[56] References Cited

U.S. PATENT DOCUMENTS

| | | | |
|---|---|---|---|
| D. 179,525 | 1/1957 | Porter | 248/513 |
| 2,184,192 | 12/1939 | McCline et al. | 248/513 |
| 2,607,398 | 8/1952 | Andrews | 248/513 |
| 3,058,251 | 10/1962 | Brooks | 43/17 |
| 3,360,224 | 12/1967 | Baumann, Jr. | 248/530 |
| 4,235,409 | 11/1980 | Cummings | 248/538 |
| 4,506,468 | 3/1985 | Willhite | 43/17 |
| 4,565,025 | 1/1986 | Behrle | 43/21.2 |
| 4,650,146 | 3/1987 | Duke | 248/512 |
| 5,058,308 | 10/1991 | Girard | 43/21.2 |

Primary Examiner—P. Austin Bradley
Assistant Examiner—Chuck Y. Mah
Attorney, Agent, or Firm—Hugh E. Smith

[57] ABSTRACT

A device for holding two fishing rods simultaneously comprising a vertically positionably post, the post having a lower end insertable into the ground, the post having an upper end with an extent formed at an acute angle with respect to the vertical and a horizontal component at the upper end of the upper extent adapted to be held by the person fishing, the post having an intermediate extent to orient the upper extent at an elevation to locate the lower portion of a fishing rod at a convenient height for the person fishing; a pair of tubes secured to the post adjacent to the upper extent thereof to orient the tubes with the axes at a common acute angle from the vertical with the axes of the tubes being rotationally displaced at an acute angle whereby two fishing rods supported by the tubes will extend at a proper angular orientation with respect to the horizontal and at a proper angular orientation with respect to each other.

1 Claim, 4 Drawing Sheets

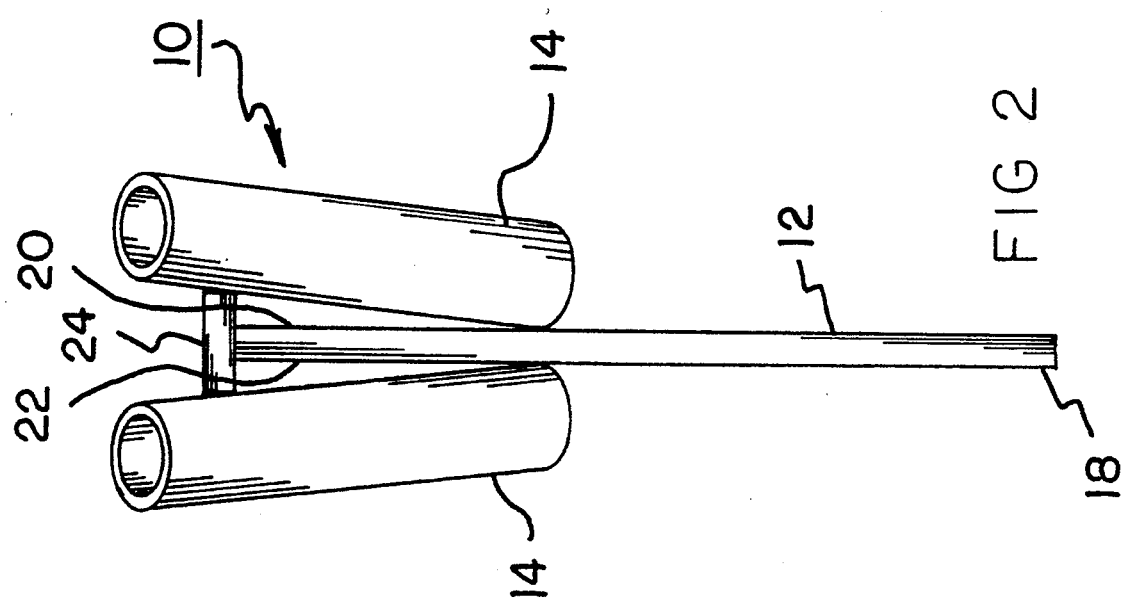
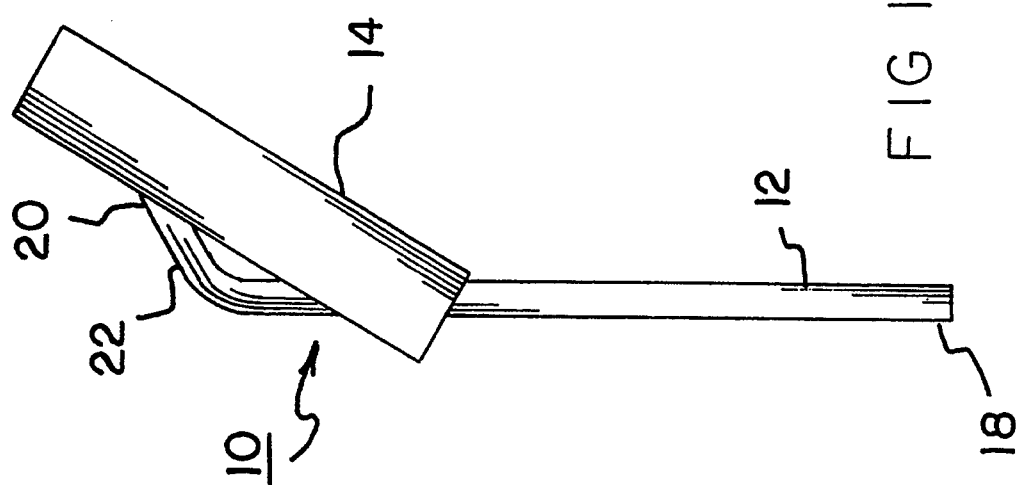

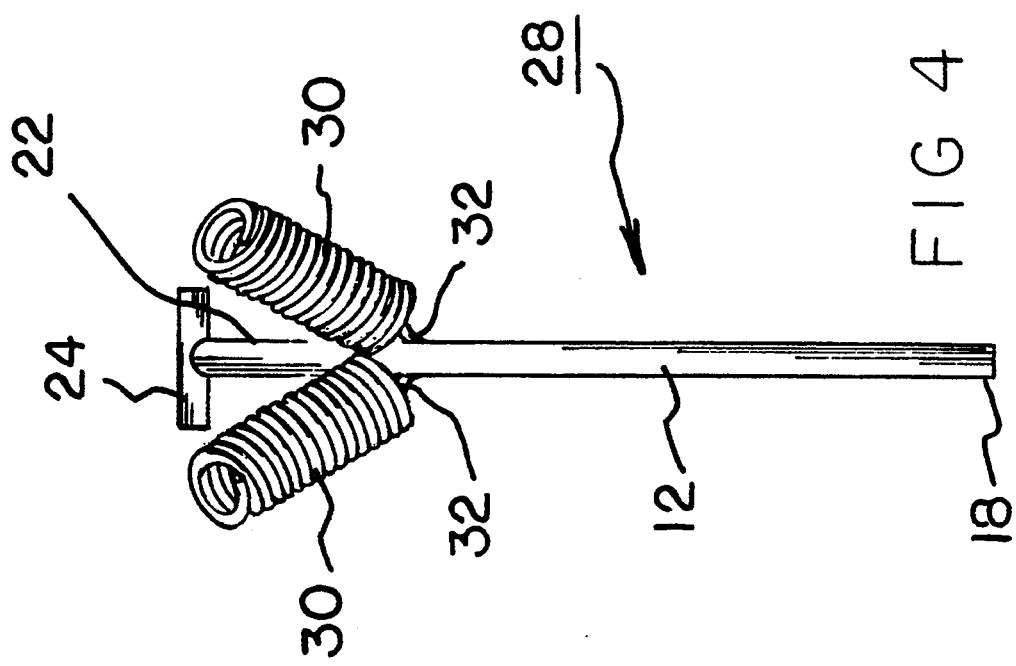
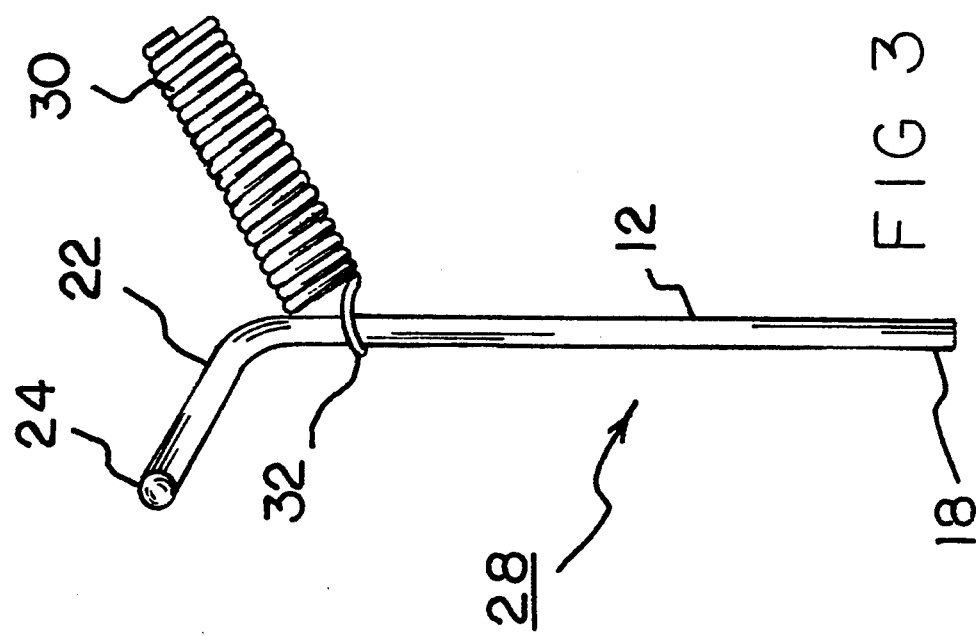

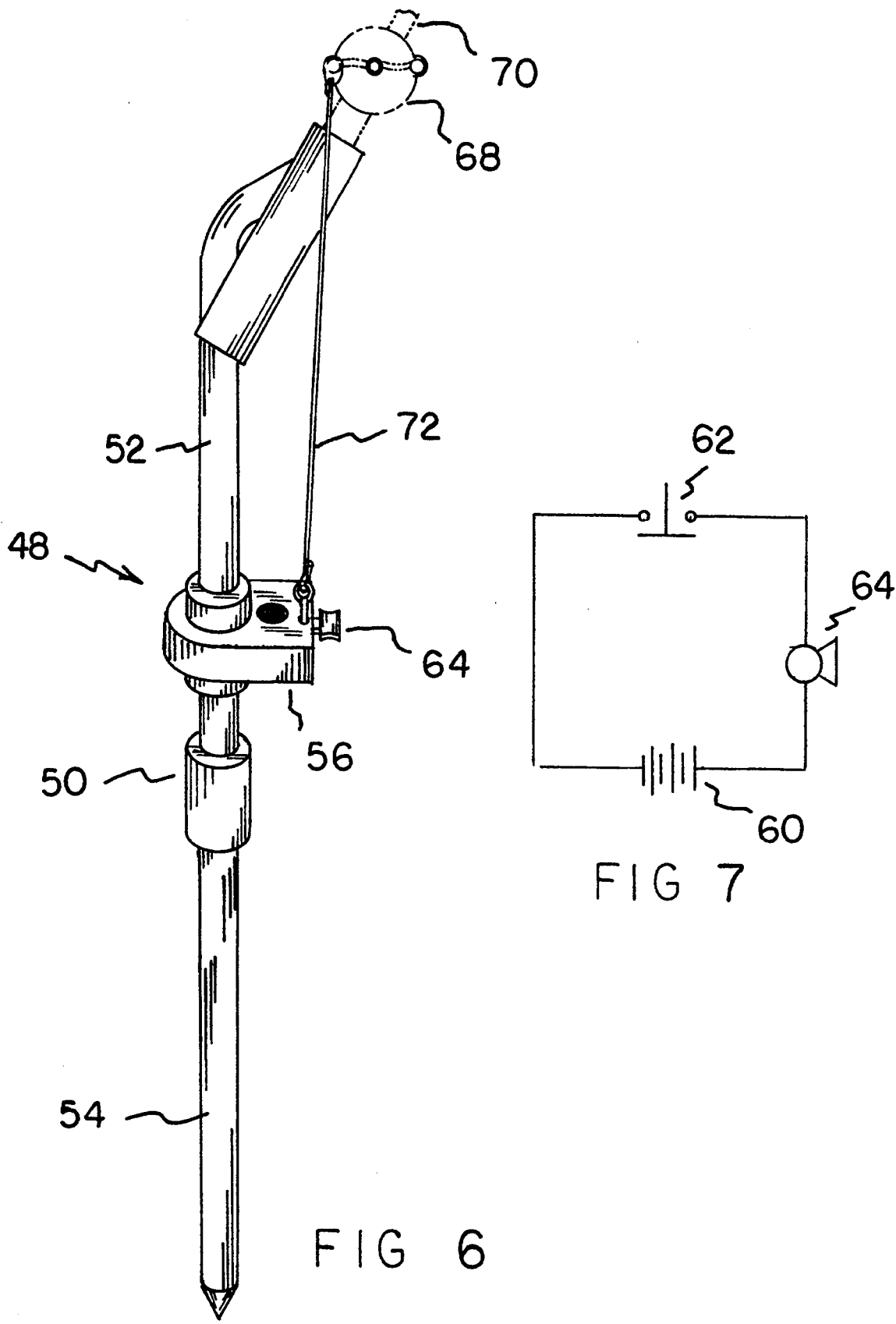

FISHING ROD HOLDERS

BACKGROUND OF THE INVENTION

1. Field of the Invention

The present invention relates to fishing rod holders and more particularly pertains to devices which may be used to simultaneously hold two fishing rods.

2. Description of the Prior Art

The use of fishing rod holders is known in the prior art. More specifically, the fishing rod holders heretofore devised and utilized for the purpose of holding a fishing rod are known to consist basically of familiar, expected and obvious structural configurations, notwithstanding the myriad of designs encompassed by the crowded prior art which have been developed for the fulfillment of countless objectives and requirements.

The prior art discloses various devices for holding fishing rods while fishing. Most, however, require a large number of moving parts in a complex configuration increasing costs and complexity. Note McKinsey U.S. Pat. No. 4,197,668; Banta U.S. Pat. No. 3,205,606; Gibbons U.S. Pat. No. 3,453,765. Simpler devices for supporting fishing rods are disclosed in Phillips U.S. Pat. No. 4,156,982 and Mack U.S. Pat. No. 4,157,803. These two disclosures relate to simplified supports but are specifically configured for coupling to the gunwale of a boat. None relates to inserting the supporting device into the ground and for holding two fishing rods.

In this respect, the fishing rod holder according to the present invention substantially departs from the conventional concepts and designs of the prior art, and in so doing provides an apparatus primarily developed for the purpose of holding plural fishing rods at a proper angle.

Therefore, it can be appreciated that there exists a continuing need for new and improved fishing rod holders which can be used to hold two rods at proper orientations. In this regard, the present invention substantially fulfills this need.

SUMMARY OF THE INVENTION

In view of the foregoing disadvantages inherent in the known types of fishing rod holders now present in the prior art, the present invention provides improved holders for plural fishing rods. As such, the general purpose of the present invention, which will be described subsequently in greater detail, is to provide a new and improved fishing rod holder apparatus and method which has all the advantages of the prior art fishing rod holders and none of the disadvantages.

To attain this, the present invention essentially comprises a device for holding two fishing rods simultaneously while fishing comprising in combination a vertically positionably post, the post having a lower end insertable into the ground at a location for fishing, the post having an upper end with an extent formed at an angle of about 45 degrees with respect to the vertical and a horizontal component at the upper end of the upper extent adapted to be held by the person fishing when applying force to insert the lower end into the ground, the post having an intermediate extent to orient the upper extent at an elevation to locate the lower portion of a fishing rod at a convenient height for the person fishing; a pair of tubes secured to the post adjacent to the upper extent thereof to orient the tubes with the axes at a common angle of between about 30 and 60 degrees from the vertical with the axes of the tubes being rotationally displaced at an angle of between about 15 and 30 degrees whereby two fishing rods supported by the tubes will extend at a proper angular orientation with respect to the horizontal and at a proper angular orientation with respect to each other.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved fishing rod holders which have all the advantages of the prior art holding devices and none of the disadvantages.

It is another object of the present invention to provide new and improved fishing rod holders which may be easily and efficiently manufactured and marketed.

It is a further object of the present invention to provide new and improved fishing rod holders which are of a durable and reliable construction.

An even further object of the present invention is to provide new and improved fishing rod holders which are susceptible of a low cost of manufacture with regard to both materials and labor, and which accordingly is then susceptible of low prices of sale to the consuming public, thereby making such fishing rod holders economically available to the buying public.

Still yet another object of the present invention is to provide new and improved fishing rod holders which provide in the apparatuses and methods of the prior art some of the advantages thereof, while simultaneously overcoming some of the disadvantages normally associated therewith.

Still another object of the present invention is to hold plural fishing rods at proper angles and orientations.

Yet another object of the present invention is to enhance the enjoyment of fisherpersons.

Even still another object of the present invention is to provide a new and improved a device for holding two fishing rods simultaneously comprising a vertically positionably post, the post having a lower end insertable into the ground, the post having an upper end with an extent formed at an acute angle with respect to the vertical and a horizontal component at the upper end of the upper extent adapted to be held by the person fishing, the post having an intermediate extent to orient the upper extent at an elevation to locate the lower portion of a fishing rod at a convenient height for the person fishing; a pair of tubes secured to the post adjacent to the upper extent thereof to orient the tubes with the axes at a common acute angle from the vertical with the axes of the tubes being rotationally displaced at an acute angle whereby two fishing rods supported by the tubes will extend at a proper angular orientation with respect to the horizontal and at a proper angular orientation with respect to each other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a fishing rod holder constructed in accordance with the principles of the present invention.

FIG. 2 is a front elevational view of the device shown in FIG. 1.

FIG. 3 is a side elevational view of a fishing rod holder constructed in accordance with an alternate embodiment of the invention.

FIG. 4 is a front elevational view of the device shown in FIG. 3.

FIG. 6 is an illustration of yet another alternate embodiment of the invention.

FIG. 7 is a circuit diagram of the electronic components of the FIG. 6 embodiment.

DESCRIPTION OF THE PREFERRED EMBODIMENT

Figure 5:
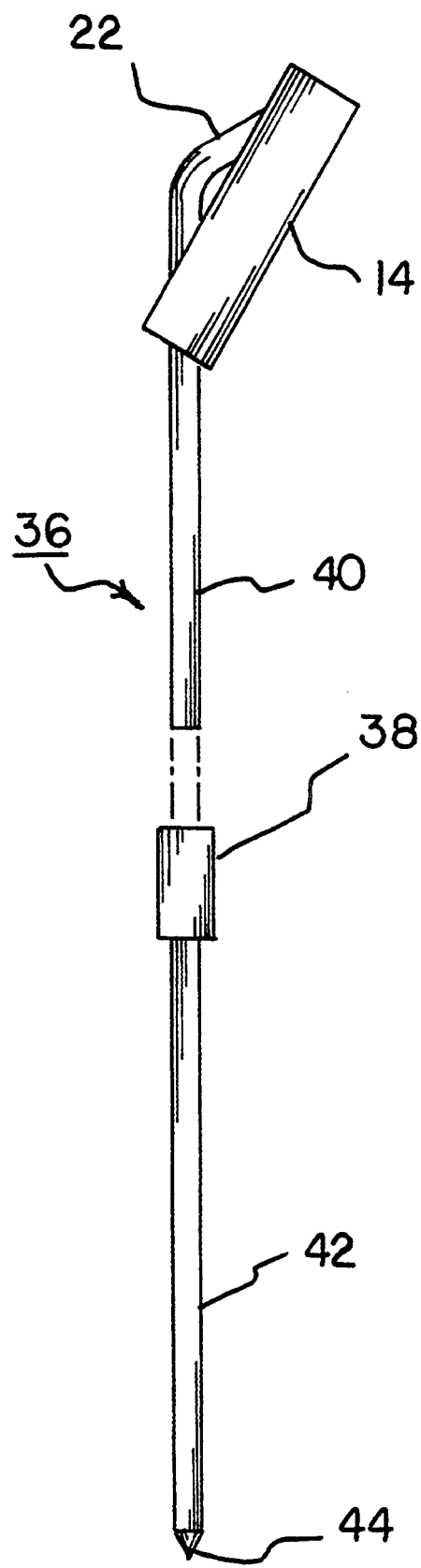
FIG. 5 is a side elevational view similar of that in FIGS. 1 and 2 but illustrating an alternate embodiment of the invention wherein the post is formed of two separable sections.

With reference now to the drawings, and in particular to FIG. 1 thereof, a new and improved fishing rod holder embodying the principles and concepts of the present invention and generally designated by the reference numeral 10 will be described.

More specifically, it will be noted that FIGS. 1 and 2 illustrate the primary embodiment of the a device 10 for holding two fishing rods simultaneously while fishing.

The device comprises, in combination, simply a post 12 formed of several components and a pair of strategically oriented tubes 14.

The post 12 is a vertically positionably member formed of a rigid metal, preferably steel although other materials such as plastic could be utilized. It has a lower end 18 which is insertable into the ground at a location for fishing. The post has an upper end 20. At the upper end is an upper extent 22 which is formed at an acute angle, preferably about 45 degrees with respect to the vertical. The post 12 also includes a horizontal component 24 at the upper end of the upper extent. The horizontal component is adapted to be held by the person fishing when carrying the device and when applying force to insert the lower end into the ground. The post 12 also has an intermediate extent to orient the upper extent at a proper elevation. A proper elevation is one adapted to locate the lower region of a fishing rod, not shown, at a convenient height for the fishing person.

The second component, or more accurately components, are a pair of tubes 14. The tubes are fabricated of a rigid material, preferably steel although other materials such as plastic could be utilized, with cylindrical side walls, an open top and a closed bottom secured to the post adjacent to the upper extent as by welding to the horizontal component 24. The tubes are oriented so that their axes are at a common angle of between about 30 and 60 degrees from the vertical. The axes of the tubes are rotationally displaced equally and oppositely at an acute angle of between about 15 and 30 degrees. In this manner, two fishing rods may be supported by the tubes. So supported, the fishing rods will extend at a proper acute angular orientation with respect to the horizontal. They will also extend at a proper acute angular orientation with respect to each other.

FIGS. 3 and 4 illustrate an alternate embodiment of the device 28. In such embodiment, the post 12 is essentially the same as that of the first embodiment. The tubes 14, however, are replaced by the coil springs 30 which function as the holders for the fishing rods. The tubes 30 are fabricated of coil springs with their interior lower ends 32 bent outwardly and coupled to the central extent of the post adjacent to the upper extent of the intermediate extent.

In the FIG. 5 embodiment, the device 36 has a post 38 is formed of two readily separable portions 40 and 42. The separation between the upper portion 40 and lower portion 42 is located at a central extent of the post 38. The separation allows for easier packing, storing and transporting. In such embodiment, the lower end of the post is formed with a point 44 to facilitate insertion into the ground. Such point could be utilized on any prior embodiment.

The embodiment of FIGS. 6 and 7 show a device 48 with a post 50 formed with upper and lower portions 52 and 54. The device further includes electrical components secured to the post in a housing 56. The electrical components include a power source 60, a normally open switch 62 and noise emitter 64. The switch is adapted to the coupled to the reel 68 of a supported fishing rod 70 through a line 72. In this manner, movement of the line 72 as caused by the catching of a fish will close the switch 62. This will initiate the emitting of a noise by the emitter 64 to warn the person fishing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device for holding two fishing rods simultaneously while fishing consisting of:

a vertically positionable post, the post having a lower end insertable into the ground at a location for fishing, the post also having an upper end, the post also having a bend between the upper end and lower end to provide an upper extent formed at an angle of about 45 degrees with respect to the vertical and a transverse horizontal component at the upper end of the upper extent adapted to be held by the person fishing to insert the lower end into the ground through the application of a downward force, the post having an intermediate extent between the bend and the lower end to orient the upper extent at an elevation to locate the lower portion of a fishing rod at a convenient height for the person fishing;

a pair of cylindrical tubes with open upper ends and lower ends and axes along their lengths fixedly attached at their lower ends to the post beneath the bend to orient the tubes with their axes at a common angle of between about 30 and 60 degrees from the vertical and with the axes of the tubes being rotationally displaced at an angle of between about 15 and 30 degrees whereby two fishing rods supported by the tubes will extend at a proper angular orientation with respect to the horizontal and at a proper angular orientation with respect to each other.

* * * * *